350-96.11 SSS SR
4/4/78 OR 4,082,424

United States Patent [19]
Sauter et al.
[11] 4,082,424
[45] Apr. 4, 1978

[54] INTEGRATED OPTIC DEVICE

[75] Inventors: Gerald Francis Sauter; George Franklin Nelson, both of St. Paul, Minn.

[73] Assignee: Sperry Rand Corporation, New York, N.Y.

[21] Appl. No.: 709,468

[22] Filed: Jul. 28, 1976

[51] Int. Cl.[2] .......... G02B 5/14
[52] U.S. Cl. .......... 350/96.11; 350/96.15; 350/151; 350/162 R
[58] Field of Search .......... 350/96 WG, 96 C, 151, 350/162 R

[56] References Cited

U.S. PATENT DOCUMENTS

| | | | |
|---|---|---|---|
| 3,752,563 | 8/1973 | Torok et al. | 350/162 R |
| 3,985,423 | 10/1976 | Tseng | 350/96 WG |
| 3,990,776 | 11/1976 | Tseng et al. | 350/96 WG |

OTHER PUBLICATIONS

"Thin-film optical magnetic mode conventers" by R. D. Henry in Apl. Phys. Letts., vol. 26, No. 7, Apr. 1975, pp. 408–411.

*Primary Examiner*—John K. Corbin
*Assistant Examiner*—Stewart Levy
*Attorney, Agent, or Firm*—Kenneth T. Grace; William E. Cleaver; Marshall M. Truex

[57] ABSTRACT

A solid state apparatus for and a method of (1) coupling a light beam to a dielectric waveguide, (2) modulating the intensity of the coupled, diffracted light beam, and (3) multiplexing the coupled, diffracted light beam within the waveguide to any one of several detectors. The apparatus uses a liquid-phase epitaxially (LPE) grown film of bismuth substituted rare earth iron garnet to form a magnetizable layer in which stripe domains may be generated, sustained and moved about. The stripe domains from a diffraction grating, the stripe domain width and orientation of which may be altered by the application of external magnetic fields—see the E. J. Torok, et al., U.S. Pat. No. 3,752,563. The altered stripe domains are, in turn, utilized to alter the coupling of the light beam to the waveguide and to alter the direction that the coupled, diffracted light beam is directed within the waveguide.

7 Claims, 8 Drawing Figures

32 H 30 34 42c 42b 42a 42d 24 36 36a 42e H 28 42f 22 40

INTEGRATED OPTIC DEVICE

BACKGROUND OF THE INVENTION

In the prior art is is known that the field of integrated optics includes many solid state devices that operate as optical waveguides for optical communication systems—see the publication "Survey of Integrated Optics," S. E. Miller, IEEE Journal of Quantum Electronics, Volume QE-8, No. 2, February 1972, pages 199 - 205. Recently developed thin-film technology has permitted the fabrication of miniature, solid state devices that permit the transfer of optical power from a thin-film structure to an associated optical fiber transmission line—see the I. P. Kaminow, et al, published patent application B 381,985, published Feb. 3, 1976. The present invention is considered to be an improvement over these known prior art devices.

SUMMARY OF THE INVENTION

The present invention relates to a diffraction grating consisting of a stripe domain garnet film that is in intimate contact with a suitable waveguide member, both supported by a suitable substrate member. The laser beam that is directed incident to the surface of the stripe domain garnet film is selectively, varyingly coupled to the waveguide (modulated in intensity) and is selectively, varyingly directioned along the plane of the waveguide to be directed upon a selected one of a plurality of detectors for retransmission to an associated optical fiber transmission line (multiplexed). The magnetic film stripe domain diffraction grating of the E. J. Torok, et al, U.S. Pat. No. 3,752,563 and the method of operation thereof is utilized as the means for coupling, modulating and multiplexing the laser beam to and within the optical waveguide for subsequent processing of the data that is borne by the laser beam.

DESCRIPTION OF THE PREFERRED EMBODIMENT

The present invention relates to a multi-functional integrat d optical device that utilizes the magneto-optic effect and the stripe domain characteristics of a liquid-phase epitaxy (LPE) film or layer of, e.g., bismuth substituted rare earth iron garnet ($Bi_XYb_{3-X}Fe_5O_{12}$), wherein X has the range $0.7 < X < 1.2$. The stripe domains in the epitaxial film form a phase grating structure whereby the amplitude and direction of an incident, e.g., laser, light beam can be altered within an associated waveguide by the application of an external magnetic field that is oriented in the plane of the epitaxial film and that is varied in magnitude and direction.

Figure 1A:
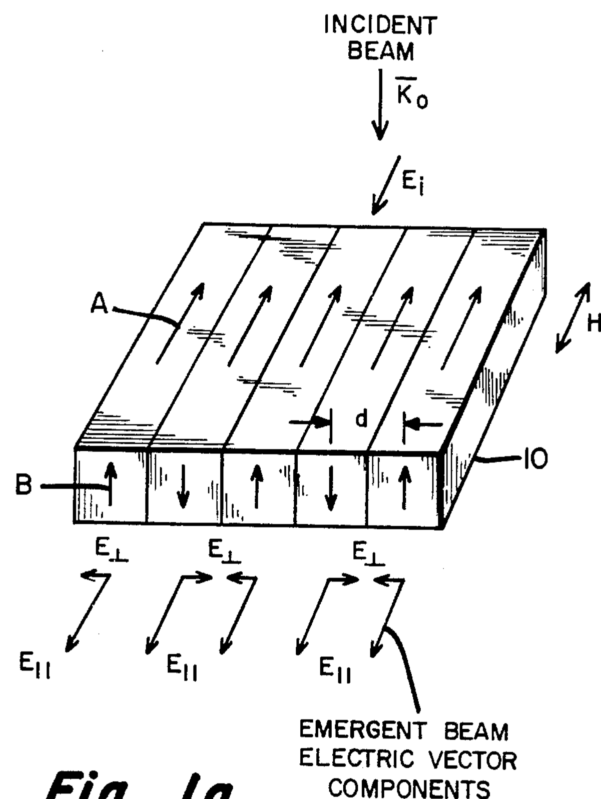
FIGS. 1*a*, 1*b* are illustrations of the stripe domain patterns that are utilized by the present invention.
Figure 1B:
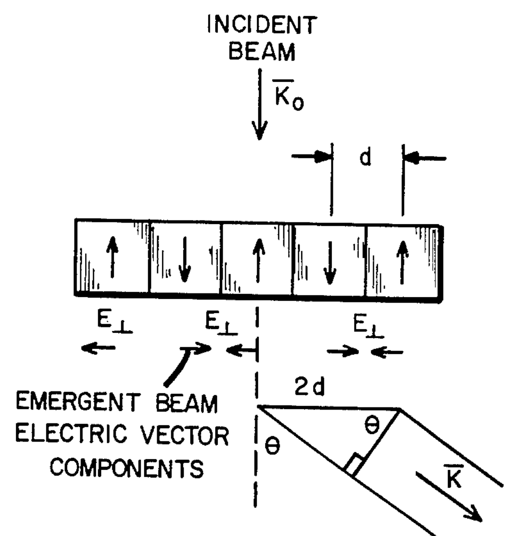

With particular reference to FIGS. 1*a*, 1*b* there is illustrated the stripe domain pattern that is found in an LPE rare earth iron garnet film 10. The stripe domain pattern of the magnetization M within film 10 consists of parallel components, A, in the plane of the film 10, and parallel and anti-parallel components, B, that are normal to the plane of the film 10. These stripe domains can introduce a periodic 180° phase-variation in an incident light beam.

Consider a plane electro-magnetic wave, $K_o$, incident on film 10. This plane wave $K_o$ experiences a periodic phase variation as it propagates through the film 10. The phase change is due to the Faraday rotation, and the periodicity is caused by the parallel and anti-parallel nature of the normal components, B, of the magnetization M of film 10. The emergent differentially rotated light beam K has an electric vector component $E_\perp$ which is orthogonal to the direction of the stripe domain pattern. In the far field region, this alternating vector pattern causes constructive interference at angles $\phi_n$ given by the equation $$\sin \phi_n = n\lambda o/2d$$

where $n$ is the order of the beam ($n = 0, 1, 3, 5$, etc.) and $d$ is the stripe domain spacing. The maximum intensity in a diffracted beam K is attained when the Faraday rotation is ±90°. In this special case, 81% of the light goes into the first order diffracted beam, 9% goes into the third order diffracted beam, etc. If the Faraday rotation is less than ±90°, only the efficiency, not the diffracted angle, $\phi$, is affected.

The domain spacing, $d$, and therefore the angle of diffraction, $\phi$, can be changed by an external magnetic field, H, that is applied parallel to the stripe domain length and in the plane of the film 10. In addition, the entire stripe domain pattern can be rotated about an axis that is normal to the plane of the film 10 by simply rotating the external magnetic field, H, about the same axis. This is as taught by the E. J. Torok, et al, U.S. Pat. No. 3,752,563. To form an integrated optic device the crystal grating structure formed by the epitaxial film 10 is placed in intimate contact with a thin film dielectric waveguide. This results in an integrated optic device for (1) coupling light to the waveguide, (2) intensity modulating the coupled, diffracted light within the waveguide, and (3) steering the coupled, diffracted light within the waveguide.

Figure 2:
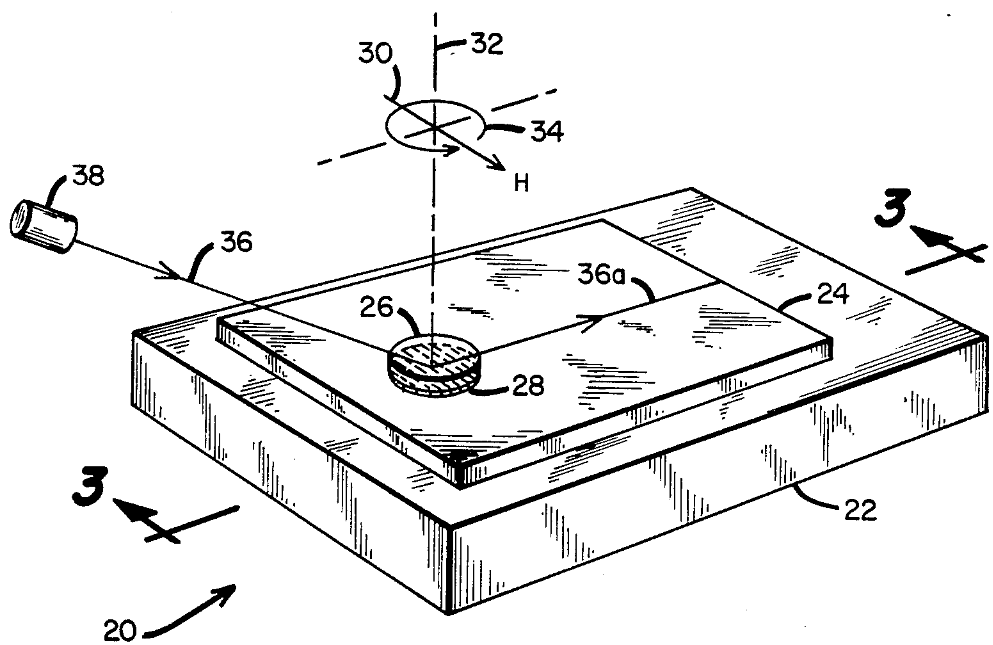
FIG. 2 is a perspective view of a first embodiment of the integrated optic device of the present invention.

With particular reference to FIG. 2 there is illustrated a perspective view of an integrated optic device 20 that is constructed according to the present invention. Optic device 20 consists of a substrate member 22, to the top surface of which is deposited or grown a waveguide member 24. Upon the top surface of waveguide member 24, and bonded thereto by a suitable bonding and index matching material, is a substrate member 26 having an epitaxial layer 28 affixed to the bottom side thereof. Also illustrated is the external magnetic field H that is supplied parallel to the stripe domain length in the direction 30 that is in the plane of the film 28. The separation $d$ of the stripe domains may be varied by varying the magnitude and polarity of the external magnetic field H while the orientations of the stripe domains may be varied by varying the orientation of the external magnetic field H about the axis 32, which axis 32 is normal to the plane of the film 28, as represented by line 34. This variation of the spacing of the stripe domains varies the intensity of the coupled, diffracted light beam 36a from light beam 36 and laser beam source 38, that is coupled to waveguide 24 while the variation of the orientation of the external magnetic field H rotates the coupled, diffracted light beam 36a about axis 32 throughout the plane of waveguide 24.

Figure 3:
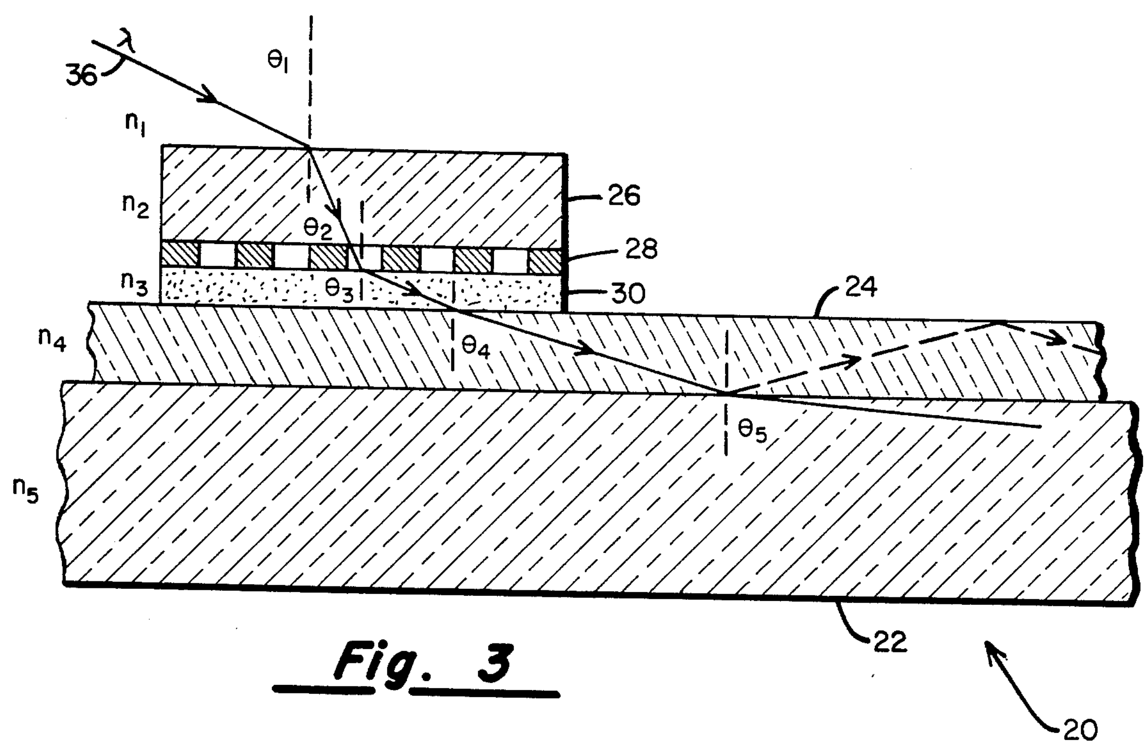
FIG. 3 is a cross sectional view of the integrated optic device of FIG. 2 taken along line 3—3 thereof.

With particular reference to FIG. 3 there is presented an illustration of a cross section of the optic device 20 of FIG. 2 taken along line 3—3 thereof. The cross section of FIG. 3 is presented to illustrate, in more detail, the orientation of the respective members of the optic device 20 and the coupling of the laser light beam 36 into waveguide 24. The integrated optic device 20 of FIGS. 2, 3 is comprised of the following exemplary components:

Substrate 22—glass, 1 millimeter (mm) in thickness having an index of refraction $n_5$.

Waveguide 24—glass, 0.5 mm in thickness having an index of refraction $n_4 > n_5$.

Bonding layer 30—polystyrene film, optically transmissive at the wave length λ of the light beam 36, 5,000 angstroms (A) in thickness, having an index of refraction $n_3 \approx n_4$.

Film 28—liquid-phase epitaxial (LPE) film formed upon substrate 26, $Bi_XYb_{3-X}Fe_5O_{12}$, wherein X has the range $0.7 < X < 1.2$, 4.0 microns (μm) in thickness.

Substrate 26—single crystal of gadolinium gallium garnet (GGG) film, 0.5 mm in thickness, having an index of refraction $n_2 > n_3$.

Figure 4:
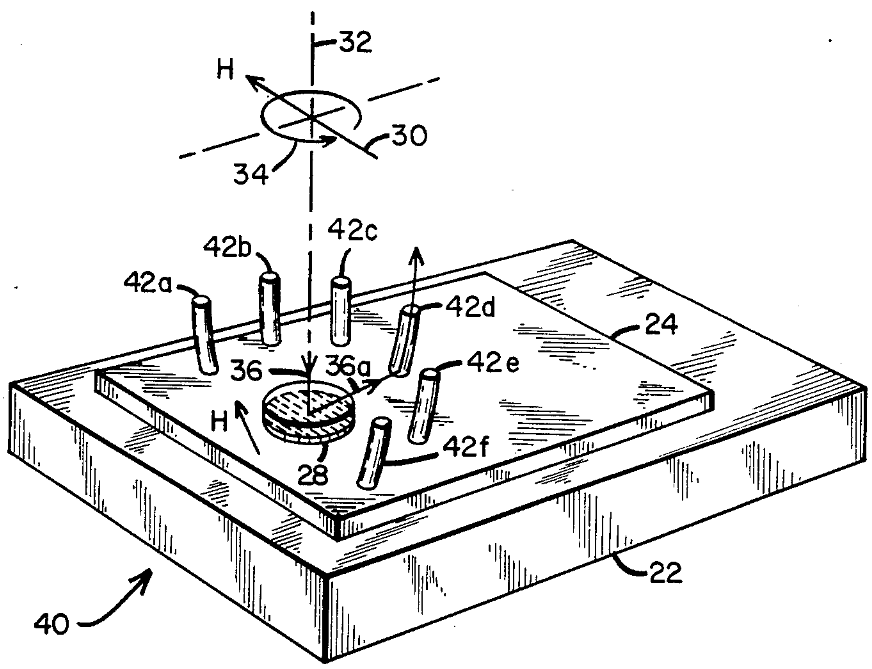
FIG. 4 is a perspective view of a second embodiment of the integrated optic device of the present invention.

With particular reference to FIG. 4 there is presented an optic device 40 of the present invention. Optic device 40 is substantially similar to optic device 20 of FIG. 2 except that a plurality of optical fibers 42a - 42f have been integrally formed upon waveguide 24 at a predetermined radius and a predetermined angular spacing about film 28. Optic device 40 functions as an optical multiplexer for a laser light beam 36 that is directed along axis 32 that is oriented perpendicular to the plane of film 28. In this configuration, the coupled, diffracted laser light beam 36a may be modulated in intensity by the variation of the external magnetic field H when applied parallel to the stripe domain length in the direction 30 that is in the plane of the film 28 while the coupled, diffracted light beam 36a may be rotated in the plane of waveguide 24 to be focused upon a selected one of the optical fibers 42a - 42f by varying the orientation of the external magnetic field H about the axis 32 in the direction represented by vector 34 such that the direction of the stripe domain lengths are oriented orthogonal to a line drawn to a selected one of the optical fibers 42a - 42f.

Figure 5:
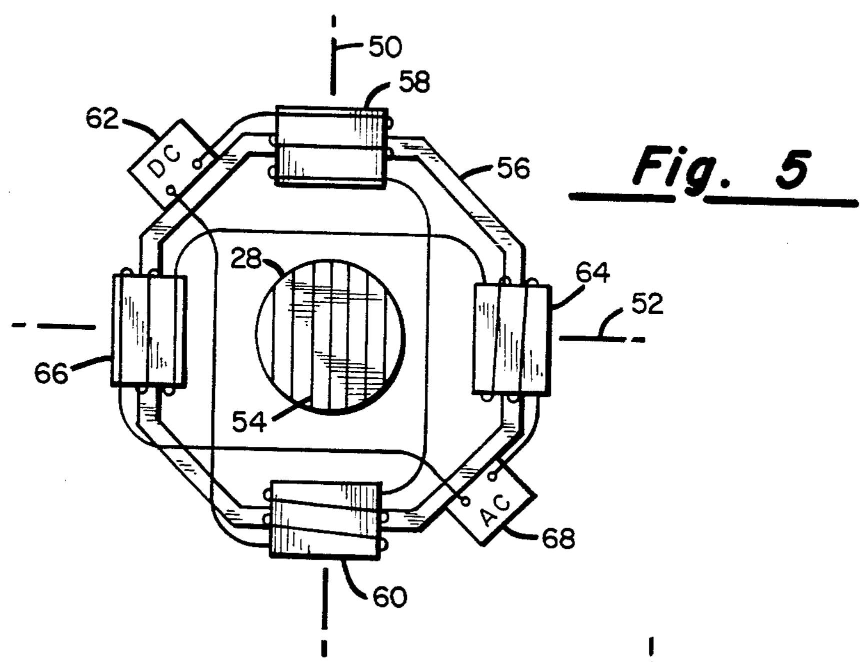
FIG. 5 is an illustration of a device for applying the necessary operating fields to the stripe domain film of FIGS. 1-4.

With particular reference to FIG. 5 there is presented an illustration of a device for applying orthogonal AC, DC fields parallel to and in the plane of film 28 of FIGS. 1 - 4. Film 28 has associated therewith two orthogonal axes 50, 52, in the plane of the film 28 with axis 50 oriented parallel to the stripe domain walls 54. About film 28 is a yoke 56, rotatable about an axis that is normal to the plane of the film 28 and that passes through the intersection, in the plane of film 28, of axes 50, 52, such as axis 32 of FIGS. 2, 4, upon which are mounted: DC field coils 58, 60 and the associated DC drive signal source 62; and, AC field coils 64, 66 and the associated AC drive signal source 68. As stated in the above referenced E. J. Torok, et al, U.S. Pat. No. 3,752,563, when a magnetic film 28 having its magnetization arranged in a plurality of stripe domains is effected by a DC field that is parallel to, or in, the plane of the film and parallel or anti-parallel to the magnetization polarization of the stripe domains, the strip domain width $d$ is made to vary; when the applied DC field is parallel to the magnetization polarization, the stripe domain width $d$ decreases; when the applied DC field is anti-parallel to the magnetization polarization, the stripe domain width $d$ increases. However, the stripe domains have a coercive force associated therewith that tends to prevent changes in stripe domain width $d$. It is therefore necessary to overcome the coercive force with an oscillating (AC) field that is directed in the plane of the film and perpendicular to the stripe domain walls, and, of course, finally, the average magnetization polarization. The separation $d$ of the stripe domains of film 28 may be varied by varying the magnitude and polarity of DC coil generated external magnetic field H, while the orientation of the stripe domains may be varied by rotating the yoke 56 about the axis 32, thus varying the orientation of the DC coil generated external magnetic field H about the axis 32.

Figure 6:
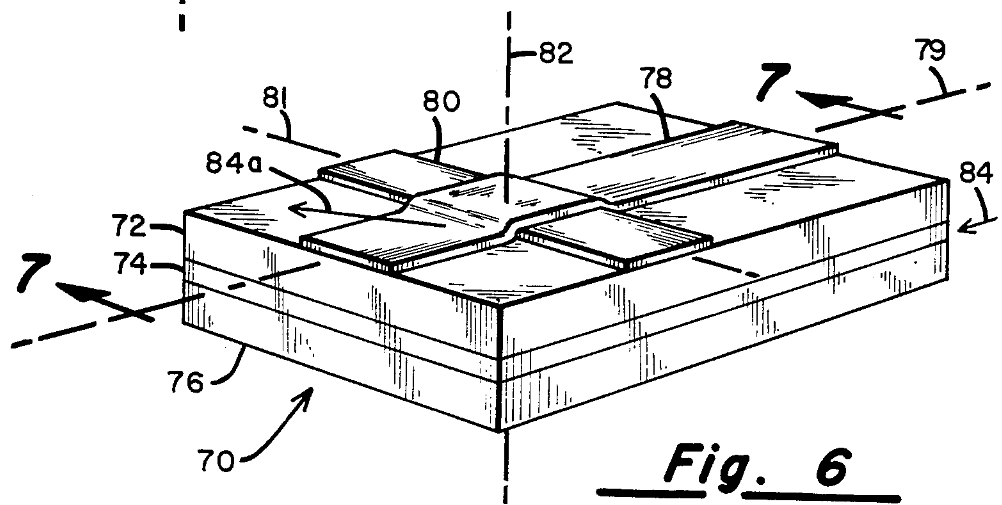
FIG. 6 is a perspective view of a third embodiment of the integrated optic device of the present invention.

With particular reference to FIG. 6 there is illustrated a perspective view of an integrated optic device 70 that is constructed according to the present invention. Optic device 70 consists of a substrate 72, to the bottom surface of which is deposited or grown a liquid-phase epitaxial film 74 in which a plurality of stripe domains are capable of being generated, sustained and moved about. Next, upon the bottom surface of stripe domain layer 74 there is deposited or grown a waveguide member 76. Substrate 72, stripe domain layer 74 and waveguide member 76 may be similar to the corresponding substrate member 26, stripe domain film 28 and waveguide 24 of FIGS. 1, 2, 3. Upon the top surface of substrate 72 are formed, by any one of many well-known techniques, two conductive lines 78, 80, insulatively separated from each other by a suitable insulative layer such as a layer of silicon monoxide (SiO).

Conductive lines 78 and 80 are aligned along the associated orthogonal longitudinal axes 79 and 81. Also provided is a third axis, oriented normal to the plane of the integrated optic device 70 that passes through the intersection of axes 79 and 81. Conductive members 78 and 80 form the means whereby suitable currents may be caused to flow therethrough generating the appropriate in-plane field $H_R$ for providing an active area in the superposed portion of stripe domain layer 74, which in-plane field $H_R$ causes such superposed area of stripe domain layer 74 to function in a manner similar to that of the discrete layer 28 of the integrated optic device 20 of FIGS. 1 - 4. In this configuration, a light beam 84 is coupled normal to one end surface of waveguide 76, passing through waveguide 76 until, in the area of the active area in stripe domain layer 74, it is diffracted upwardly and out of the top surface of substrate 72 as light beam 84a.

Figure 7:
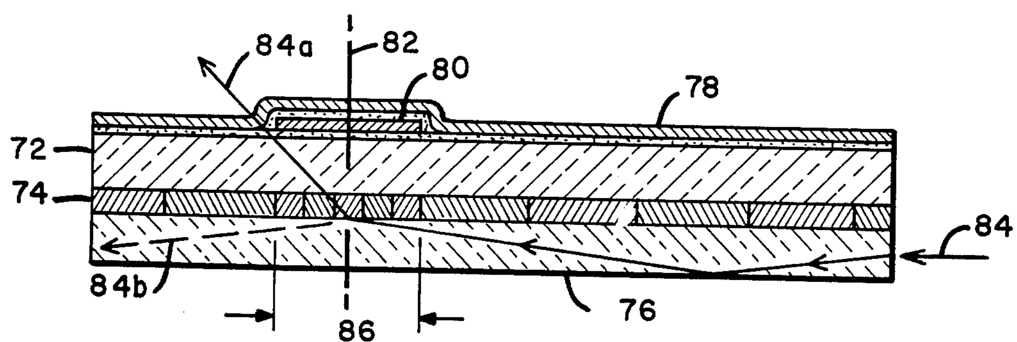
FIG. 7 is a cross sectional view of the integrated optic device of FIG. 6 taken along line 7—7 thereof.

With particular reference to FIG. 7 there is presented an illustration of a cross section of the integrated optic device 70 of FIG. 6 taken along line 7—7 thereof. The cross section of FIG. 7 is presented to illustrate, in more detail, the orientation of the respective members of the integrated optic device 70 and the coupling of the laser light beam 84 via the active area 86 of stripe domain layer 74 as defined by the superposed portions of conductive lines 78 and 80. Stripe domain layer 74, in its active area 86, has a grating constant or periodicity that is of a coupling value for coupling the light beam 84 to and out of the top surface of the substrate 72 while, conversely, stripe domain layer 74 has outside of the active area 86 a grating constant or periodicity that is of a non-coupling value. Accordingly, by applying the proper current signals to the orthogonally aligned conductive lines 78 and 80, the periodicity of the stripe domains in the active area 86 may be varied for converting its periodicity to a non-coupling value such as in the portion of stripe domain layer 86 that is outside of the active area 76 whereby the light beam 84 would be caused to cross through the waveguide 76 to be emitted, as light beam 84*b*, from its end surface opposite to that of the end surface to which light beam 84 is incident.

What is claimed is:

1. An integrated optic device, comprising:

a substrate member;

a magnetizable film integral with said substrate member and having a plurality of parallel stripe domains aligned along a first axis in the plane thereof, said stripe domains having a substantially uniform periodicity of a width *d;* means for directing a light beam incident to said magnetizable film;

magnetic field H means for coupling a DC external magnetic field H to said magnetizable film, said field H having a variable magnitude and polarity and a variable rotatable orientation in the plane of said magnetizable film, the variable magnitude and polarity of said field H adjustable to generate a corresponding variation in the variable width *d* of said stripe domains and a corresponding angular deflection of said light beam and said variable orientation of said field H adjustable to generate a corresponding variation in the rotatable orientation of said stripe domains and a corresponding angular rotation of said light beam;

a plurality of optic fibers oriented about a predetermined area of said magnetizable film, each oriented at a predetermined radial distance and a predetermined angular spacing and;

means affecting said magnetic field H means for simultaneously rotating and deflecting said light beam and directing said sorotated and deflected light beam upon a selected one of said optic fibers.

2. An integrated optic device, comprising:

a first substrate member;

a waveguide member that is integral with said first substrate member;

a second substrate member;

a magnetizable film in which stripe domains are capable of being generated, sustained and moved, said magnetizable film being a layer that is integral with a first surface of said second substrate member;

a bonding layer sandwiched between and bonding said magnetizable film, and accordingly said second substrate member, to said waveguide member;

means for coupling a DC external magnetic field H to said magnetizable film, said field H having a variable magnitude and polarity and a variable rotatable orientation in the plane of said magnetizable film, the variable magnitude and polarity of said field H adjustable to generate a corresponding variation in the variable width *d* of said stripe domains and said variable orientation of said field H adjustable to generate a corresponding variation in the rotatable orientation of said stripe domains;

a plurality of optic fibers formed integral with said waveguide member, said optic fibers oriented about a predetermined area of said magnetizable film at predetermined radial distances and predetermined angular spacings;

laser means for directing a laser light beam incident upon the second surface of said second substrate member and thence upon said magnetizable film; and means rotating said field H in the plane of said magnetizable film for rotating said laser light beam in the plane of said waveguide member and directing said rotated laser light beam upon a selected one of said optic fibers.

3. The integrated optic device of claim 2 in which the periodicity of the stripe domains within said predetermined area is of a coupling value for coupling a diffracted portion of said laser light beam out of said waveguide member and into and through said substrate member and in which the periodicity of the stripe domains outside of said predetermined area is of a coupling value for directing said laser light beam along and within said waveguide member.

4. An integrated optic device, comprising:

a substrate member;

a magnetizable film in which stripe domains are capable of being generated, sustained and moved, said magnetizable film being a layer that is integral with a first surface of said substrate member;

a waveguide member that is integral with said magnetizable film;

a plurality of optic fibers formed integral with said waveguide member, said optic fibers oriented about a predetermined area of said magnetizable film at predetermined radial distances and predetermined angular spacings;

laser means for directing a laser light beam incident upon said waveguide member; and, means rotating a field H in the plane of said magnetizable film for rotating said laser light beam in the plane of said waveguide member and directing said rotated laser light beam upon a selected one of said optic fibers.

5. The integrated optic device of claim 4 in which the periodicity of the stripe domains within said predetermined area is of a coupling value for coupling a diffracted portion of said laser light beam out of said waveguide member and into and through said substrate member and in which the periodicity of the stripe domains outside of said predetermined area is of a coupling value for directing said laser light beam along and within said waveguide member.

6. An integrated optic device, comprising:

a magnetizable film having a plurality of parallel stripe domains aligned along a first axis in the plane thereof, said stripe domains having a substantially uniform periodicity of a width *d;* a waveguide member that is integral with said magnetizable film;

magnetic field H means for coupling a field H to said magnetizable film, said field H having a variable magnitude and polarity and a variable rotatable orientation in the plane of said magnetizable film, the variable magnitude and polarity of said field H adjustable to generate a corresponding variation in the width *d* of said stripe domains and said variable orientation of said field H adjustable to generate a corresponding variation in the rotatable orientation of said stripe domains;

at least three optic fibers formed integral with said waveguide member, each of said optic fibers oriented within a predetermined area of said magnetizable film at a predetermined radial distance and a predetermined angular spacing;

means for directing a light beam incident upon said waveguide member; and, means affecting said magnetic field H means to generate said variable rotation and variable width *d* of said stripe domains for rotating said light beam in the plane of said waveguide member and directing said rotated light beam upon a selected one of said optic fibers.

7. The integrated optic device of claim 6 in which the periodicity of the stripe domains within said predetermined area is of a coupling value for coupling a diffracted portion of said light beam out of said waveguide member in said predetermined area and in which the periodicity of the stripe domains outside of said predetermined area is of a coupling value for directing said laser light beam along and within said waveguide member.

* * * * *